US012580791B2

(12) United States Patent
Gautama et al.

(10) Patent No.: US 12,580,791 B2
(45) Date of Patent: Mar. 17, 2026

(54) SCALABLE DISTRIBUTION OF IDENTITY INFORMATION IN OVERLAY NETWORKS WITH IDENTITY-BASED POLICIES

(71) Applicant: Palo Alto Networks, Inc., Santa Clara, CA (US)

(72) Inventors: Bala Gautama, San Jose, CA (US); Arivu Mani Ramasamy, San Jose, CA (US); Venkata Sarat Kumar Vajrapu, Bengaluru (IN); Arun Kumar Palani, Bangalore (IN); Anil Kumar Reddy Sirigiri, Bangalore (IN); Nagaraj A. Bagepalli, Fremont, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 18/954,065

(22) Filed: Nov. 20, 2024

(65) Prior Publication Data

US 2025/0080378 A1 Mar. 6, 2025

Related U.S. Application Data

(63) Continuation of application No. 18/145,096, filed on Dec. 22, 2022, now Pat. No. 12,170,581.

(51) Int. Cl.
H04L 12/46 (2006.01)
H04L 69/22 (2022.01)

(52) U.S. Cl.
CPC .......... H04L 12/4633 (2013.01); H04L 69/22 (2013.01); H04L 2212/00 (2013.01)

(58) Field of Classification Search
CPC .. H04L 12/4633; H04L 69/22; H04L 2212/00
(Continued)

(56) References Cited

U.S. PATENT DOCUMENTS 6,081,840 A * 6/2000 Zhao ..................... H04L 69/329
709/224
8,266,327 B2 9/2012 Kumar et al.
(Continued)

FOREIGN PATENT DOCUMENTS

CN 120419130 A * 8/2025 ......... H04L 61/5007

OTHER PUBLICATIONS

PCT Application No. PCT/US2023/083656, International Search Report, mailed Mar. 1, 2024, 3 pages.
(Continued)

*Primary Examiner* — Anthony Mejia
(74) *Attorney, Agent, or Firm* — Gilliam IP PLLC

(57) ABSTRACT

A network controller in an overlay network maintains collective sets of identity-based policies and identity mappings for onboarded users of the network for informed distribution to network elements across the network. As new users are onboarded, the controller identifies a site of the network at which the user was onboarded and determines identity mappings of the user and applicable policies for distribution to a network element at the identified site. The controller assigns index values to each identity and communicates the indices to network elements with the corresponding identity mappings and policies. The network elements encapsulate cross-site traffic with the index values corresponding to senders so recipient network elements can obtain the index value from encapsulation header formats, query the controller for the corresponding identity mappings, and apply policies to the traffic that are determined to be pertinent based on the sender's identity mappings obtained from the controller.

20 Claims, 7 Drawing Sheets

(58) Field of Classification Search
USPC ........................................................ 709/224
See application file for complete search history.

(56) References Cited

U.S. PATENT DOCUMENTS

| | | | |
|---|---|---|---|
| 9,661,026 B2 | 5/2017 | Chen et al. | |
| 9,742,626 B2 | 8/2017 | Ramachandran et al. | |
| 9,749,899 B2 | 8/2017 | Raleigh et al. | |
| 9,954,899 B2 | 4/2018 | Chen et al. | |
| 10,887,175 B2 * | 1/2021 | Hooda | H04L 41/0894 |
| 11,457,044 B2 | 9/2022 | Verma | |
| 2003/0140142 A1 | 7/2003 | Marples et al. | |
| 2008/0109870 A1 | 5/2008 | Sherlock et al. | |
| 2009/0313680 A1 | 12/2009 | Hirano et al. | |
| 2015/0146523 A1 * | 5/2015 | Yang | H04L 45/306 370/230 |
| 2015/0350069 A1 | 12/2015 | Padgett et al. | |
| 2016/0080212 A1 | 3/2016 | Ramachandran et al. | |
| 2017/0013047 A1 * | 1/2017 | Hubbard | H04L 67/535 |
| 2017/0373936 A1 | 12/2017 | Hooda et al. | |
| 2020/0252234 A1 | 8/2020 | Ramamoorthi et al. | |
| 2020/0280584 A1 * | 9/2020 | Zhao | H04L 63/16 |
| 2020/0296139 A1 | 9/2020 | Fainberg | |
| 2020/0382471 A1 | 12/2020 | Janakiraman et al. | |
| 2021/0136871 A1 | 5/2021 | Bull et al. | |
| 2022/0393943 A1 * | 12/2022 | Pangeni | H04L 41/0894 |
| 2023/0291735 A1 | 9/2023 | Cheethirala et al. | |
| 2024/0214242 A1 * | 6/2024 | Ramaraj | H04L 12/4633 |
| 2025/0126511 A1 * | 4/2025 | Starsinic | H04W 48/20 |

OTHER PUBLICATIONS

PCT Application No. PCT/US2023/083656, Written Opinion, mailed Mar. 1, 2024, 9 pages.

Palo Alto Networks, Inc., "Enable User—and Group-Based Policy", Tech Docs, Palo Alto Networks [online], [retrieved on Nov. 18, 2022] Retrieved from the Internet: <https://docs.paloaltonetworks.com/pan-os/9-1/pan-os-admin/user-id/enable-user-and-group-based-policy>, 4 pages.

Palo Alto Networks, Inc., "Enable User-ID", Tech Docs, Palo Alto Networks [online], [retrieved on Nov. 18, 2022] Retrieved from the Internet: <https://docs.paloaltonetworks.com/pan-os/9-1/pan-os-admin/user-id/enable-user-id#idea4ae539-91e4-4e58-9299-6d92dbf7e24a>, 8 pages.

* cited by examiner

SCALABLE DISTRIBUTION OF IDENTITY INFORMATION IN OVERLAY NETWORKS WITH IDENTITY-BASED POLICIES

BACKGROUND

The disclosure generally relates to electronic communication techniques (e.g., CPC class H04) and arrangements for maintenance, administration, or management of packet switching networks (e.g., CPC subclass H04L 41/00).

Overlay networks are virtual or logical networks that are implemented on top of a physical network. Some overlay networks are created based on software-defined networking (SDN) technology, with software-defined wide area networks (SD-WANs) being a common example. An SD-WAN is a wide area network (WAN) that uses SDN technologies to address the limitations of traditional WANs for organizations arising from the often widespread geographic distribution of branch locations of the organization and increasing adoption of cloud-delivered applications. Components of an SD-WAN include SD-WAN edges, which are the network elements that can be located at sites across the SD-WAN (e.g., data center(s) and branch(es)), and an SD-WAN controller, which provides management for SD-WAN edges.

Security appliances (e.g., firewalls) enforce policies that define an action to take on detected network traffic based on attributes of the network traffic. These attributes typically include the Internet Protocol (IP) address associated with the network traffic, so a policy often defines an IP address or range of IP addresses for which the security appliance should enforce the policy. Some security appliances can enforce policies that define actions to take on network traffic based on user identity information with which network traffic is determined to be associated. Such user identity information includes user identifiers (e.g., username) and/or user group membership associated with the source of detected network traffic.

BRIEF DESCRIPTION OF THE DRAWINGS

Embodiments of the disclosure may be better understood by referencing the accompanying drawings.

DESCRIPTION

Figure 1:
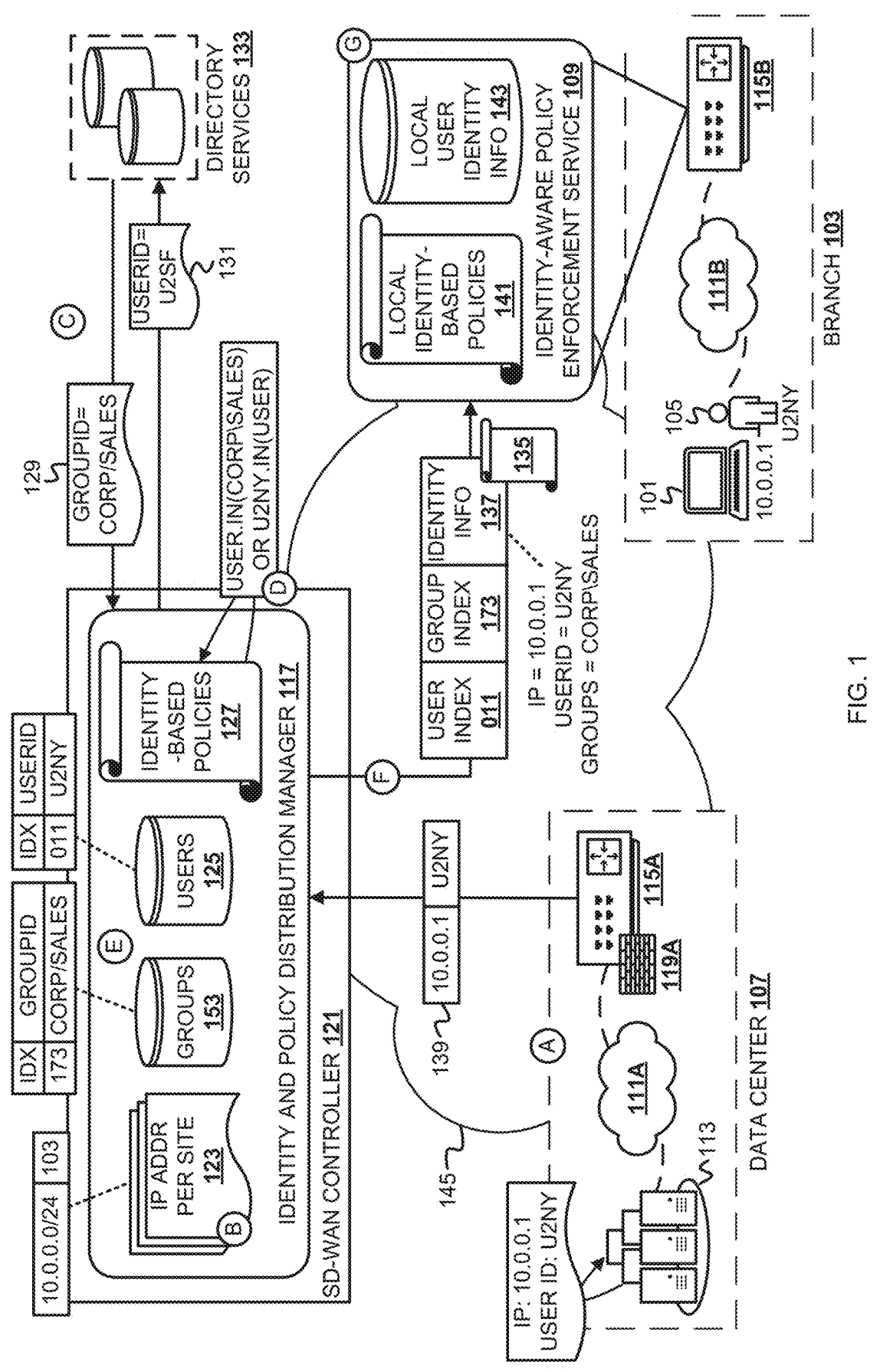
FIG. 1 is a conceptual diagram of informed distribution of identity information and identity-based policies across network elements in an overlay network.

The description that follows includes example systems, methods, techniques, and program flows to aid in understanding the disclosure and not to limit claim scope. Well-known instruction instances, protocols, structures, and techniques have not been shown in detail for conciseness.

Terminology

This description uses shorthand terms related to cloud technology for efficiency and ease of explanation. When referring to "a cloud," this description is referring to the resources of a cloud service provider. For instance, a cloud can encompass the servers, virtual machines, and storage devices of a cloud service provider. In more general terms, a cloud service provider resource accessible to customers is a resource owned/managed by the cloud service provider entity that is accessible via network connections. Often, the access is in accordance with an application programming interface (API) or software development kit provided by the cloud service provider.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Overview

Enforcement of identity-based policies for network traffic relies on knowledge of mappings between user and/or group identifiers and IP addresses (hereinafter "identity mappings") so that the identity corresponding to the source addresses of detected packets can be determined and any applicable policies can be identified. Maintaining identity mappings for the collective set of users within an organization on each deployed network element poses a challenge with scalability, particularly in overlay networks that encompass multiple sites of an organization or have large quantities of users (e.g., SD-WANs). Storing such vast amounts of data locally at each network element can be costly both in terms of the latencies incurred and the monetary cost associated with the hardware that can accommodate the data storage.

Described herein are techniques for tailoring the identity mappings and identity-based policies that are stored on a network element in an overlay network to the endpoints (i.e., the users and/or devices) located at the corresponding site of the network. A network controller (e.g., an SD-WAN controller) maintains the collective sets of identity-based policies and identity mappings. As new users are onboarded in the network, the controller determines identity mappings of the user and any applicable identity-based policies and distributes the identity information and policies to a network element located at a site of the network at which the user is located. Sites of the network can be data centers or branches having a network device deployed that can communicate with the controller. Network elements across the network thus maintain identity mappings and policies that correspond to users at their corresponding site. The controller also assigns "identity indices" to each unique identity, or each user and/or group, by which the controller can be queried for retrieval of the corresponding identity mappings. Identity indices assist in low-overhead communication of identities between network elements located at different sites and are distributed to network elements along with the corresponding identity-based policies and identity mappings. Each network element at a site of the network will thus maintain identity-based policies and identity information for users local to the site rather than the collective set of policies and identity information, which are maintained by the controller for informed distribution across network elements and corresponding sites of the network.

The identity indices obtained by network elements facilitate retrieval of identity mappings for application of identity-based policies when cross-site network traffic is detected. When a network element detects packets to be sent to another site in the network (e.g., branch-to-branch traffic), the network element encapsulates one or more of the packets with a header comprising the identity index for the user corresponding to the source IP address associated with the packets, which can be derived based on the associated identity mapping obtained from the controller. The network element at the recipient site identifies the identity index of the sender based on the header format and queries the controller with the identity index to retrieve the corresponding identity mappings, including the user identifier and any group identifiers. The network element can then determine whether any of the identity-based policies enforced at that site are applicable to the incoming packets based on the retrieved identity mappings.

Example Illustrations

FIG. 1 is a conceptual diagram of informed distribution of identity information and identity-based policies across network elements in an overlay network. FIG. 1 depicts an SD-WAN 145 that comprises an SD-WAN controller 121 (hereinafter "the controller 121"). The SD-WAN 145 comprises at least two sites in this example, which include a data center 107 and a branch 103. Servers 113 are located in the data center 107. A user 105 who has been issued a device 101 is located at the branch 103. For instance, the servers 113 may be servers of an organization of which the user 105 is an employee, and the device 101 may be issued to the user 105 by this organization. A network element 115A and a network element 115B are deployed to the data center 107 and the branch 103, respectively. In implementations where the SD-WAN 145 comprises a hub-and-spoke network topology, the network element 115A and network element 115B can be a hub network element and spoke network element, respectively. The network elements 115A-B in this example are SD-WAN edges deployed to the respective ones of the sites that are controlled/managed by the controller 121. This example depicts the network element 115A as comprising a firewall 119A. The firewall 119A may be implemented as part of functionality of the network element 115A (e.g., as a service executing as part of the network elements 115A) and/or via an agent executing on the network element 115A. In implementations, the firewall 119A may be a physical or virtual firewall that is separate from the network element 115A. Also, in implementations, the network element 115B may similarly comprise or be communicatively coupled to a firewall. The servers 113 are connected to a network 111A of the data center 107. The device 101 is connected to a network 111B of the branch 103. The networks 111A-B may be local area networks (LAN) that are interconnected via the SD-WAN 145.

The controller 121 comprises an identity and policy distribution manager 117 (hereinafter "the distribution manager 117"). The distribution manager 117 maintains identity-based policies 127 ("policies 127") that have been installed thereon. The policies 127 are policies defined for the SD-WAN 145 to be applied to network traffic based on the identity associated with the source network traffic and can include security policies, network path selection policies, and/or quality of service (QoS) policies. The identity associated with network traffic in this example encompasses users and/or groups of users such that the policies 127 comprise user-based policies and/or group-based policies. The policies 127 may comprise policies that are to be applied across sites of the SD-WAN 145 and/or policies defined for certain sites of the SD-WAN 145, such as identity-based policies that are defined for and to be applied to network traffic corresponding to the branch 103. The distribution manager 117 also maintains Internet Protocol (IP) addresses per site 123. The IP addresses per site 123 map indications of sites of the SD-WAN 145 (e.g., site identifiers) to IP addresses associated with that site, such as with IP address prefixes or other aggregates of IP addresses associated with the LANs at each site, and can be stored in a database or data structure. In this example, the IP addresses per site 123 indicate that the branch 103 is associated with the set of IP addresses given by the IP address prefix 10.0.0.0/24. The IP addresses per site 123 are created and maintained based on configuration of network interfaces of network devices deployed across the SD-WAN 145 (e.g., the network elements 115A-B). In implementations where the controller 121 comprises or acts as a route reflector, the distribution manager 117 can ascertain one or more of the IP addresses per site 123 that correspond to an indirect next hop through route reflection.

FIG. 1 is annotated with a series of letters A-G. These letters represent stages of one or more operations. Although these stages are ordered for this example, the stages illustrate one example to aid in understanding this disclosure and should not be used to limit the claims. Subject matter falling within the scope of the claims can vary from what is illustrated.

At stage A, the network element 115A communicates an IP address-user identifier mapping 139 ("the mapping 139") to the distribution manager 117 based on association of the user 105 with the IP address of the device 101. Association of the user 105 with the device 101 IP address may occur when the user 105 is onboarded in the SD-WAN 145 based on issuance of the device 101 to the user 105, authentication of the user 105 (e.g., to the firewall 119A) according to an authentication mechanism employed by the organization or other tenant of the SD-WAN 145 (hereinafter simply "the tenant"), and initial user login, based on which the firewall 119A can derive the association between the identifier of the authenticated user 105 (e.g., username) and device 101 IP address, given as user identifier "U2NY" and IP address 10.0.0.1 in this example. When the user 105 and device 101 are onboarded (e.g., during a first user authentication and login event), an Active Directory server or a similar server among the servers 113 may be updated with the identifier of the user 105 and the IP address of the device 101. As an example of the firewall 119A deriving IP address and user identifier mappings based on user authentication and login events, the firewall 119A may monitor network events for the servers 113 and identifies when new users are being onboarded or users are otherwise being associated with device IP addresses based on user identifiers and corresponding IP addresses being stored. For instance, the firewall 119A may monitor network events corresponding to system event logs of the servers 113 that indicate new logins. As another example, the firewall 119A may have agents deployed to the servers 113 (not depicted in FIG. 1) that monitor event logs and communicate events of one or more types, such as login events, to the firewall 119A. The information indicated in the mapping 139 is propagated from the one of the servers 113 to the distribution manager 117 via the firewall 119A and network element 115A. In implementations where the firewall 119A is separate from the network element 115A (e.g., is a physical firewall), the firewall 119A communicates the user identifier and IP address to the network element 115A for propagation to the distribution manager 117.

At stage B, the distribution manager 117 determines to which site of the SD-WAN 145 the mapping 139 corresponds. The determination informs the distribution manager 117 of the location of the SD-WAN 145 at which the newly onboarded user is located. The distribution manager 117 identifies the IP address included in the mapping 139 and determines the corresponding site based on the IP addresses per site 123. In this example, the distribution manager 117 determines that the IP address 10.0.0.1 included in the mapping 139 corresponds to the network prefix 10.0.0.0/24 that is associated with the branch 103 in the IP addresses per site 123 and thus identifies the mapping 139 as corresponding to the branch 103.

At stage C, the distribution manager 117 determines of which groups the user referenced in the mapping 139 is a member. The distribution manager 117 has access to directory services 133 of the tenant of the SD-WAN 145. The directory services 133 can comprise servers maintained on-premises, such as one or more of the servers 113 described above. The directory services 133 can alternatively or additionally comprise one or more cloud servers that maintain directory information for the tenant (e.g., a cloud-based Lightweight Directory Access Protocol (LDAP) server). The distribution manager 117 submits a query 131 to the directory services 133 for identifiers of any groups (i.e., groups of users) of which the user 105 is a member. The query 131 indicates the identifier of the user 105 identified in the mapping 139. A response 129 to the query 131 indicates that the user 105 is a member of a group named "corp/sales" (e.g., a sales department within the tenant organization). The distribution manager 117 has thus determined that the user identified in the mapping 139 is located at the branch 103, has user identifier "U2NY," and is a member of the group "corp/sales."

At stage D, the distribution manager 117 determines whether any of the policies 127 are applicable to the user 105 represented in the mapping 139. The distribution manager 117 effectively filters the policies 127 based on the identifier of the user 105 and groups of which the user 105 is a member, or "U2SF" and "corp/sales," to determine whether any of the policies 127 indicate the user and/or group identifiers. The distribution manager 117 can filter the policies 127 by searching or querying the policies 127 for those indicating the user identifier "U2NY" and/or group identifier "corp/sales." An exemplary identity-based policy that would be applicable to the user 105 is a policy to allow extended video conferencing to users in the group "corp/sales." The identity-based policies 127 may further be defined on a site-by-site basis; in other words, the policies 127 may indicate one or more sites for which they have been defined or may indicate that they have been defined for all sites. In this case, the distribution manager 117 further filters the policies 127 with the identifier of the branch 103 to determine if any of the policies defined for the branch 103 are applicable to the user 105 based on indication of the identifiers "U2NY" and/or "corp/sales." This example assumes that one or more of the policies 127 are applicable to the user 105, which are depicted in FIG. 1 as policies 135.

At stage E, the distribution manager 117 creates a user identity index 011 for the user 105 represented by the mapping 139 and a group index 173 representative of the group of which the user 105 is determined to be a member (i.e., "corp/sales"). The distribution manager 117 maintains (or has access to) a user identity database 125 that maps identity information associated with a user to indices having values uniquely created for each onboarded user and a group database 153 that maps group indices to identifiers/names of groups of which users documented in the user identity database 125 are members. The indices may be integers that can be used instead of strings that correspond to users (i.e., user identifiers) for subsequent querying of the distribution manager 117 for identity information. Identity indices may be created for users in numerical order as the users are onboarded in the SD-WAN 145; similarly, group indices may be created in numerical order as the distribution manager 117 identifies group memberships for onboarded users. For instance, the distribution manager 117 may maintain a counter(s) having an integer value that is incremented after each mapping is received from network elements in the SD-WAN 145 and that is referenced for creation of corresponding user identity indices. A similar approach may be taken for creation of group indices. Before creating the group index 173, the distribution manager 117 queries the group database 153 with the group identifier "corp/sales" to determine whether an index for this group has already been created to maintain a one-to-one mapping of group identifiers to group indices. In this example given for the user 105, the user identity index is 011, and the group index of the group "corp/sales" is 173. The distribution manager 117 updates the user identity database 125 with an entry that comprises the identifier of the user 105, or "U2NY," and the user identity index 011. While not depicted in FIG. 1 for clarity, the created entry of the user identity database 125 can also include the group index 173 and/or group identifier "corp/sales." The distribution manager 117 also updates the group database 153 with an entry that comprises the group index 173 and the group identifier "corp/sales." While depicted as updating two separate databases in FIG. 1 with group and user indices and corresponding identifiers, in implementations, the distribution manager 117 may store group and user identity indices and corresponding identifiers/names in one database in which entries are indexed by user/group index, labelled to distinguish between user and group entries, etc.

At stage F, the distribution manager 117 communicates the user identity index 011, IP address mapped to identity information 137 of the user 105, and the policies 135 to an identity-aware policy enforcement service 109 ("the service 109"). As with this example, the distribution manager 117 may also communicate the group index 173 to the service 109. The service 109 executes on the network element 115B. While depicted to execute on the network element 115B for clarity and ease of understanding, instances of the service 109 may execute on each SD-WAN edge device of the SD-WAN 145 or a subset thereof (e.g., those deployed to branches of the SD-WAN 145). The service 109 communicates with the distribution manager 117 to retrieve identity information of users at the corresponding site of the SD-WAN 145 and the applicable identity-based policies for enforcement by the network element 115B. The identity information 137 comprises the identifiers of the user 105 and the group of which the user 105 is a member as well as the IP address of the device 101 that was initially communicated in the mapping 139.

At stage G, the service 109 stores the user identity index 011, group index 173, and the identity information 137 in a local user identity information database 143 (hereinafter simply the "local identity database 143"). The local identity database 143 comprises entries for each user onboarded for the branch 103 that each indicate a user IP address and identifier, any pertinent group identifiers and/or group indices, and the corresponding user identity index. The local identity database 143 may be indexed by IP address. The service 109 also updates a set of local identity-based policies 141 ("local policies 141") with the policies 135. The local policies 141 are the subset of the policies 127 that are pertinent to the branch 103 and associated users based on filtering of the policies 127 by user identifier, group identifier, and/or branch identifier. The policies 135 can now be applied to network traffic destined to or originating from the device 101 based on querying the local identity database 143 with the device 101 IP address to retrieve the corresponding identity information that are indicated in the policies 135. To illustrate, if the network element 115B detects incoming network traffic source from the device 101, the service 109 queries the local identity database 143 with the IP address 10.0.0.1 to retrieve the associated user identifier "U2NY" and group identifier "corp/sales." Those of the local policies 141 that indicate this user identifier and/or group identifier, which includes the policies 135 retrieved from the distribution manager 117, can then be applied to the detected network traffic.

FIG. 1 depicts the firewall 119A as determining the user identifier and IP address that are included in the mapping 139. In implementations, user identifiers and IP addresses may be determined through other techniques. For example, user identifiers and IP addresses may be added by the firewall 119A to a cloud server(s) with which the controller 121 interfaces directly as users are onboarded to the SD-WAN 145.

Figure 2:
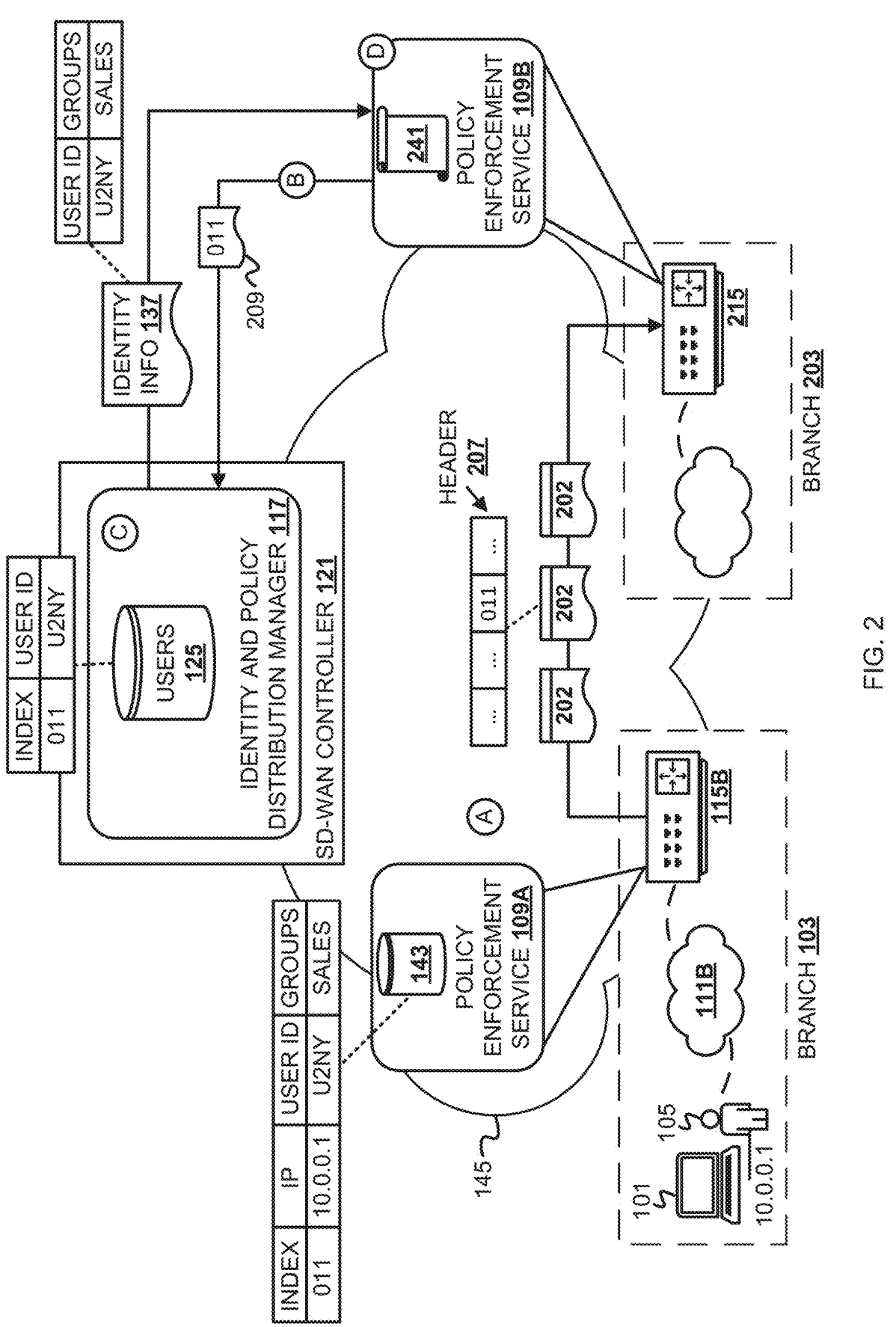
FIG. 2 is a conceptual diagram of utilizing identity indices for communicating indications of sender identity with site-to-site network traffic in a lightweight manner.

FIG. 2 is a conceptual diagram of utilizing identity indices for communicating indications of sender identity with site-to-site network traffic in a lightweight manner. In the context of site-to-site network traffic (i.e., traffic sent between network devices controlled/managed by the network controller that are at different sites of the network), the identity indices described in reference to FIG. 1 can be used by network elements to indicate identities associated with the source address of sent network traffic and retrieve corresponding identity information upon receipt of the network traffic. FIG. 2 continues with reference to FIG. 1, specifically with respect to the user identity database 125 that at least comprises entries that each indicate a user identity index and a corresponding user identifier. FIG. 2 also depicts a branch 203 as an additional site of the SD-WAN 145. The branch 203 has a network element 215 that is managed by the controller 121 deployed thereto. An instance of the service 109 also executes on the network element 215. To differentiate between the instances of the service 109, the instance executing on the network element 115B that was described in reference to FIG. 1 is hereinafter referred to as "the service 109A," and the instance executing on the network element is referred to as "the service 109B."

FIG. 2 is annotated with a series of letters A-D that represent stages of one or more operations. Although these stages are ordered for this example, the stages illustrate one example to aid in understanding this disclosure and should not be used to limit the claims. Subject matter falling within the scope of the claims can vary from what is illustrated.

At stage A, the service 109A detects one or more packets 202 originating from the device 101 that are destined for a remote site of the SD-WAN 145, or the branch 203. The service 109A can determine that the packets 202 are destined for a remote site of the SD-WAN 145 (i.e., a site different from the branch 103) based on determining the destination address of the packets 202 has not been allocated to devices connected to the network 111B; for instance, the service 109A may determine that the destination address of the packets is not encompassed by a network prefix that corresponds to the network 111B. The service 109A determines the user identity index value corresponding to the source address of the packets 202 based on querying the local identity database 143 with the source address of the packets 202, which will be the IP address of the device 101. The result of querying the local identity database 143 should indicate that the source address of the packets 202 corresponds to the user 105 who has been assigned a user identity index having a value of 011. The service 109A attaches the user identity index 011 determined to correspond to the packets 202 as metadata of at least a subset of the packets 202 via a header 207 with which the service 109A encapsulates the subset of the packets 202. The header 207 comprises the user identity index 011 as a value of a header field, such as a custom field of a header format used for encapsulation of the packets 202 (e.g., a header that comports to the Generic Network Virtualization Encapsulation (GENEVE) or Virtual Extensible LAN-Generic Protocol Extension (VxLAN-GPE) header format). Assuming that the packets 202 are allowed to pass by a corresponding one(s) of the local identity-based policies maintained by the service 109B (depicted as the policies 141 in FIG. 1), the packets 202 are forwarded toward their destination at the branch 203.

At stage B, based on detection of the packets 202, the service 109B communicates a request 209 to the distribution manager 117 for identity information corresponding to the source address of the packets 202. The service 109B identifies the user identity index 011 in the corresponding field of the header 207 of the packets 202. The request 209 communicated to the distribution manager (e.g., via invocation of an API of the distribution manager 117 by the service 109B) indicates the user identity index 011. The use of the identity indices for communicating identity information and querying the distribution manager 117 rather than IP addresses determined from packets provides consistency because the identity indices are fixed even if the IP addresses with which a user is associated change, such as if the user has multiple devices with corresponding IP addresses or if the user's device is allocated a dynamic IP address.

At stage C, the distribution manager 117 receives the request 209 and retrieves the identity information 137 corresponding to the user identity index 011 indicated therein. The distribution manager 117 determines that the request 209 indicates the user identity index 011 and queries the user identity database 125 with the user identity index 011 at least for the corresponding user identifier, or "U2NY." If group identifiers and/or indices are being stored in the user identity database 125 in association with the corresponding identity indices, the distribution manager 117 also obtains the group identifier and/or index corresponding to the user identity index 011 as a result of the querying. For query results indicating a group index(es) associated with the user, the distribution manager 117 queries the group database 153 with the group index(es) to obtain the corresponding group identifier(s). Otherwise, the distribution manager 117 can query directory services of the associated tenant for the group identifiers with which the identifier of the user 105 "U2NY" is associated.

At stage D, the distribution manager 117 communicates the identity information 137, which includes the user identifier "U2NY" and group identifier "corp/sales," to the service 109B. The service 109B obtains the identity information 137 in response to the request 209 and determines the user identifier and group identifier(s) indicated therein. The service 109B can then select applicable ones of identity-based policies 241 for enforcement/application by the network element 215 for the packets 202 based on the identity information 137.

FIGS. 1 and 2 depict distribution of identity information across network elements of corresponding branches of an SD-WAN, where the distribution manager 117 executes on an SD-WAN controller and the service 109 executes on a network element configured as a SD-WAN branch/edge device. Distribution of identity information can also be implemented in other overlay networks, such as a campus network designed/configured as an overlay network (e.g., through extension of the network across a Layer 3 IP network via VxLAN or another overlay technology). In such implementations, a network controller deployed in the network that provides instructions/commands for network management and/or orchestration of network functions comprises the functionality of the distribution manager, and first hop router(s) of the network comprise the functionality of the service 109. The distribution manager 117 can determine IP addresses and corresponding user identifiers as users are authenticated during onboarding as similarly described in reference to FIG. 1.

FIGS. 1 and 2 depict one mapping comprising a user identifier and an IP address being communicated to the distribution manager 117. In implementations, additional mappings that indicate the same user identifier may be sent to the distribution manager 117 as the user is authenticated and logs in from different devices with different IP address and/or from different sites. For instance, if the firewall 119A (or agent executing on a server that stores directory services information that communicates with the firewall 119A) identifies a login event corresponding to the user 105 that indicates a new IP address as a result of authentication and login of the user from that IP address, the firewall 119A can propagate this additional IP address/user identifier mapping to the distribution manager 117 via the network element 115A in case the user 105 has changed sites and/or devices. The distribution manager 117 can determine if the newly communicated IP address corresponds to a different site based on the IP addresses per site 123 and, if so, communicate corresponding ones of the policies 127 as described above in reference to FIG. 1. Additionally, if the user identifier ever changes, the distribution manager 117 can update the user identity database 125 with the change and can communicate the user identifier update to network elements with which it can communicate.

Figure 3:
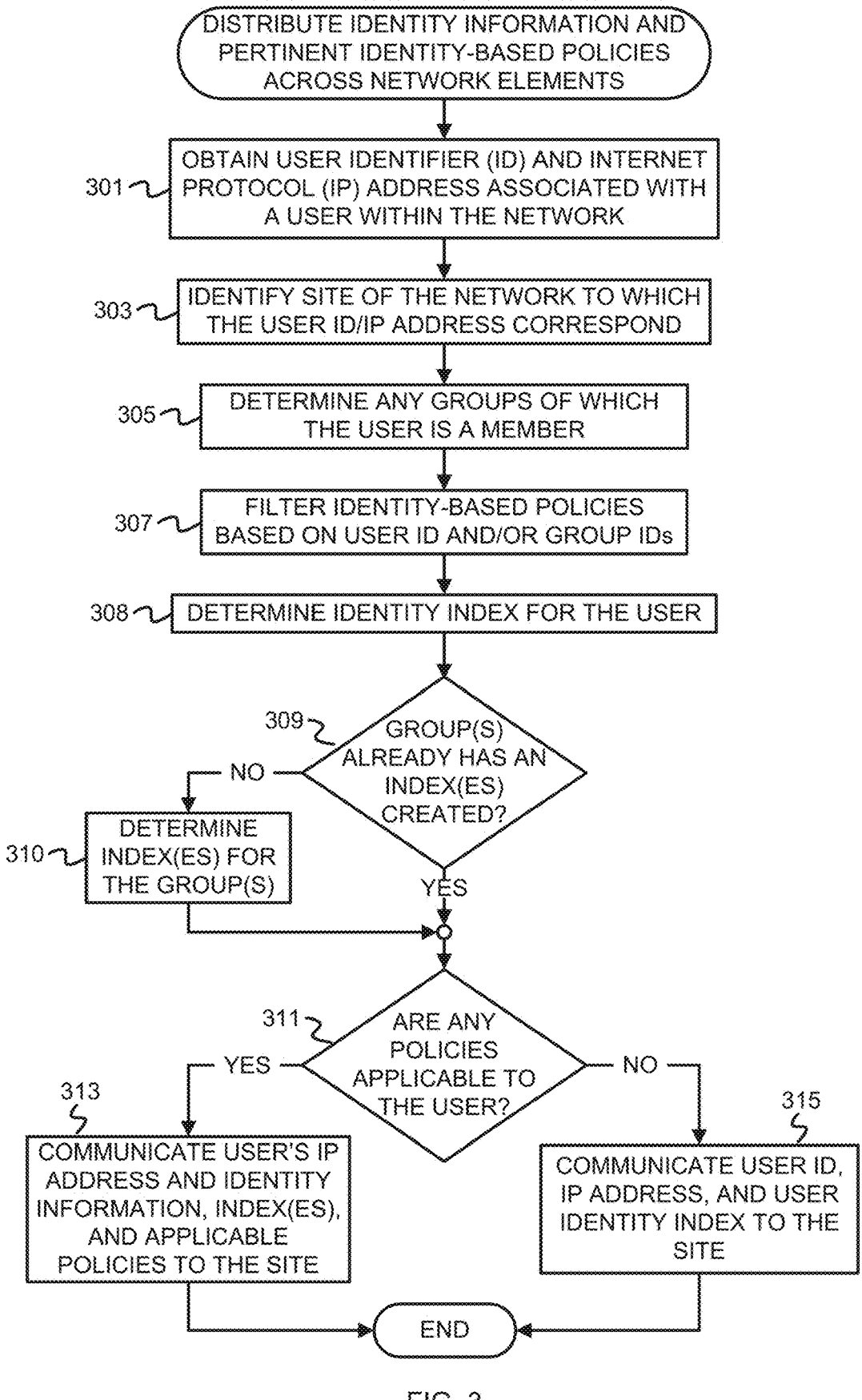
FIG. 3 is a flowchart of example operations for distributing identity information and pertinent identity-based policies across network elements of an overlay network.
Figure 4:
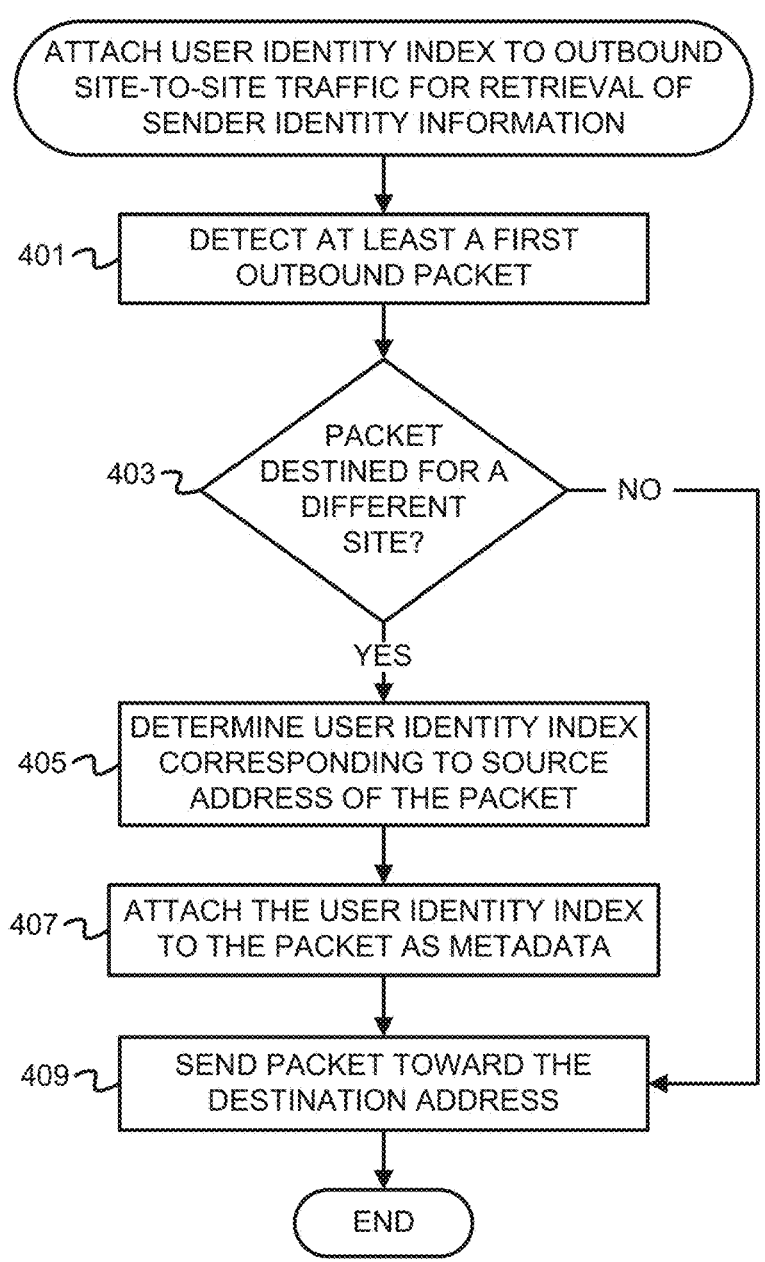
FIG. 4 is a flowchart of example operations for attaching a user identity index to outbound site-to-site network traffic for reduced-overhead retrieval of sender identity information.
Figure 5:
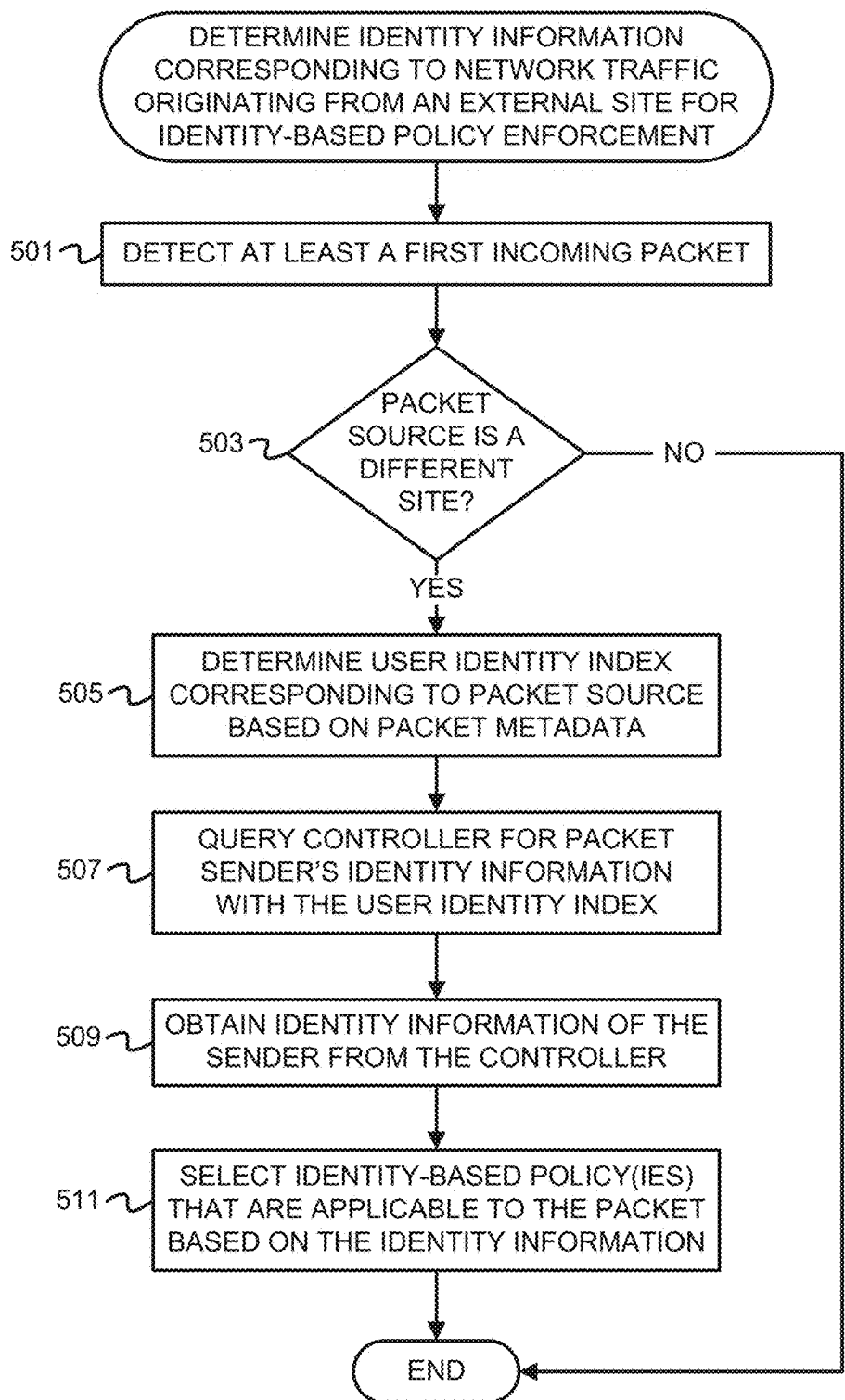
FIG. 5 is a flowchart of example operations for determining identity information corresponding to network traffic originating from an external site for identity-based policy enforcement.
Figure 6:
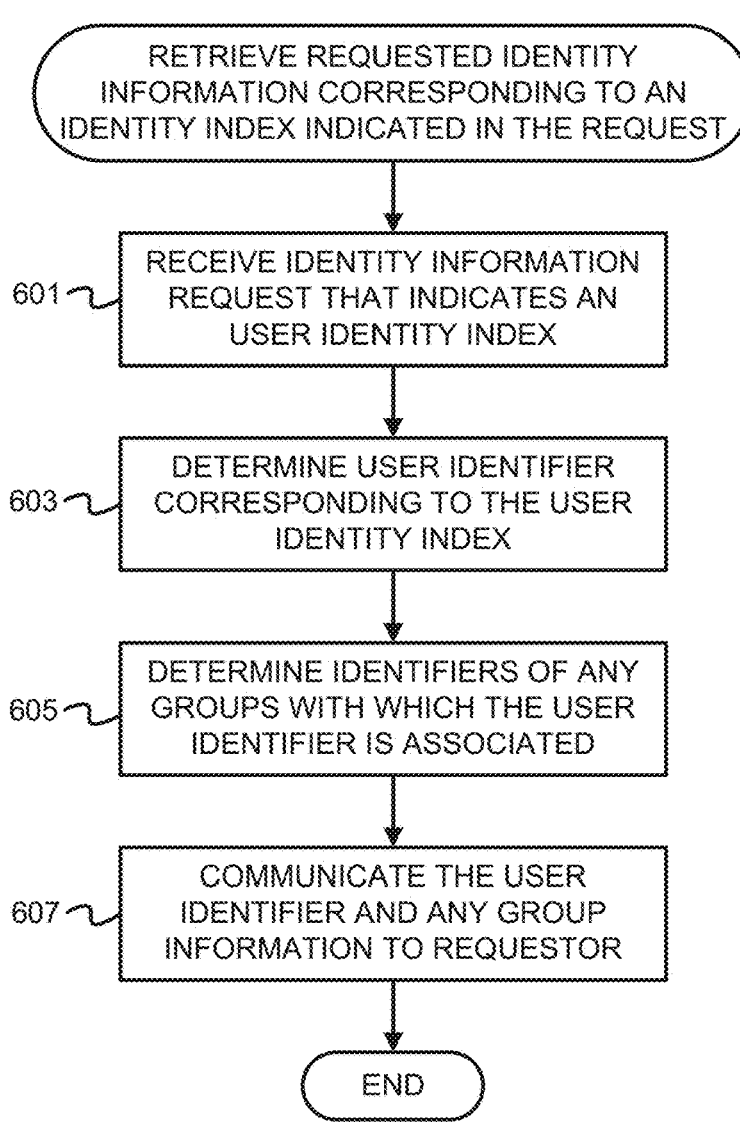
FIG. 6 is a flowchart of example operations for retrieving requested identity information corresponding to a user identity index indicated in the request.

FIGS. 3-6 are example operations for scalable distribution of identity information in overlay networks with identity-based policies. The example operations are described with reference to an identity and policy distribution manager and an identity-aware policy enforcement service (hereinafter "the distribution manager" and "the service," respectively) for consistency with the earlier figures and for ease of understanding. In particular, the example operations of FIG. 3 and FIG. 6 are described with reference to the distribution manager, and the example operations of FIGS. 4-5 are described with reference to the service. The example operations refer to the distribution manager as executing as part of a network controller (e.g., an SD-WAN controller), which may also be referred to as a controller, and the service as executing part of a network element, which may be a network device managed/controlled by the network controller. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

FIG. 3 is a flowchart of example operations for distributing identity information and pertinent identity-based policies across network elements of an overlay network. Sites of the network as referenced by the example operations can comprise sites of an SD-WAN to which an SD-WAN edge has been deployed, such as branches and/or data centers. The example operations refer the SD-WAN as being associated with an organization, though the SD-WAN may have been established for another type of tenant that comprises a grouping of individuals.

At block 301, the distribution manager obtains a user identifier and IP address associated with a user within the network. The user identifier and IP address may have been obtained via an agent deployed to monitor endpoints and/or network communications thereof in the network and/or a firewall (e.g., a next-generation firewall) that monitors network communications and propagated to the distribution manager by the agent and/or firewall. As an example, a firewall can assign an IP address to the user following initial authentication of the user and can subsequently determine the association between the IP address and the user identifier. As another example, an agent that communicates with the firewall can monitor network and/or system event logs for a network having connected a server(s) that stores directory services information of the organization (e.g., an Active Directory server, LDAP server, etc.) and identify the user identifier and IP address from a logged event or network communication corresponding to a server update and communicate the user identifier and IP address to the distribution manager via the corresponding network device managed by the SD-WAN controller (e.g., a hub network device placed at a data center). Server updates reflected in the network and/or system event logs that indicate association of a user with a device IP address include those indicative of a first login event for a user from the device or updating of the organization's directory services with the user identifier and device IP address.

At block 303, the distribution manager identifies the site of the network to which the user identifier and IP address correspond. The distribution manager maintains associations between site identifiers and indications of IP addresses associated with the sites, such as IP address prefixes or other IP address aggregates. These associations may be updated as sites of the SD-WAN are defined and corresponding subnets and/or LANs are defined or established. The distribution manager can match the IP address to one of these IP address prefixes and identify the corresponding site based on the site identifier associated with the IP address prefix. Site identifiers may be further correlated with IP addresses of the network devices managed/controlled by the controller. The distribution manager can maintain a data structure(s) or database for storing associations between user identifiers and site identifiers. The distribution manager thus can store an association between the user identifier communicated in the mapping and the identifier of the determined site.

At block 305, the distribution manager determines any groups of which the user is a member. The distribution manager can query directory services of the organization with the user identifier to retrieve identifiers of any groups for which membership of the user has been defined. The directory services maintain group memberships of users within the organization, which can be represented with associations between group identifiers and user identifiers. The directory services may comprise an on-premises and/or cloud server(s), such as an LDAP server(s) and/or Active Directory server(s), that the distribution manager queries (e.g., via an API exposed by the directory services) for any group identifiers associated with the user identifier.

At block 307, the distribution manager filters identity-based policies that have been defined based on the user identifier and/or any group identifiers. Identity-based policies, which can include user-based policies and/or group-based policies, that are defined for the organization are maintained by the distribution manager for distribution to the network elements deployed or instantiated across sites of the network. The distribution manager filters these identity-based policies to obtain those that indicate the user identifier, group identifier(s), and/or site identifier determined at block 303. Filtering policies can include searching the policies for those that satisfy criteria that the policies indicate the user identifier, an identifier of one of the groups of which the user is a member (if any), and/or site identifier or applying a filter to the policies that indicate these criteria.

At block 308, the distribution manager determines an identity index for the user (or the "user identity index"). The distribution manager determines unique indices for each onboarded user in the network that are represented with numerical bit values rather than with strings such as those used for the user identifier. As an example, the indices may be 64-bit integers, where each user is identifiable with a unique 64-bit integer. The distribution manager may utilize a value of a counter to determine the user identity index, where the counter corresponds to the number of onboarded users detected through obtaining the corresponding identifiers and IP addresses. The distribution manager stores an association between the user identity index and user identifier, such as in a database having entries corresponding to user identity indices. The distribution manager may also store any group identifiers with which the user was associated with the user identity index and user identifier.

At block 309, the distribution manager determines if the group(s) of which the user is a member already has had an index(es) created. In implementations, the distribution manager can additionally determine indices for each of the groups of which users in the network are members. Associations between group identifiers and group indices may be maintained in an additional database or data structure. The distribution manager can search this database or data structure for the group identifier(s) corresponding to the group(s) determined at block 305 to determine if an identity index(es) has already been determined for the group(s) to prevent re-assignment of index values, as group indices are global across users rather than determined per-user. If one or more of the group(s) already has had an index created, the distribution manager may update the corresponding entry of the database or other data store that maintains associations between user identity indices and user identity information with the existing group index(es). If one or more groups have not yet had an index determined, operations continue at block 310. If each group of which the user is a member already has an associated index or if the user is not a member of any groups, operations continue at block 311.

At block 310, the distribution manager determines group indices for each of the groups determined not to have an index associated. As with the user identity indices, group indices are integer values. The distribution manager may maintain a second counter for determination of group indices based on the value of the counter. Upon determination of each group index, the distribution manager updates the database or data structure that stores associations between group identifiers and group indices with an entry that maps the group identifier to the newly determined group index. In implementations where the user identity information stored in association with user identity indices comprises group indices, the distribution manager can update the entry created for the user identity index (e.g., a corresponding database entry) with the group index(es).

At block 311, the distribution manager determines if any of the identity-based policies are applicable to the user. If no policies resulted from filtering based on the identity information (i.e., the user identifier and any group identifiers) and/or the site identifier, there are no policies that are applicable to the user. If one or more policies are applicable to the user, operations continue at block 313. Otherwise, operations continue at block 315.

At block 313, the distribution manager communicates the user's IP address and identity information, determined index(es), and the applicable policies to the site. The index(es) communicated to the site at least include the user identity index and may further include the group index(es) for the group(s) of which the user is a member (if any). The distribution manager can communicate the user IP address and identity information, index(es), and policies over a secure connection established between the controller and the network element corresponding to the site (e.g., via tunneling).

At block 315, the distribution manager communicates the user identifier, IP address, and user identity index to the site. Since no policies were determined to be applicable and no presently defined policies will be enforced for the user or any group(s) of which the user is a member, the distribution manager can omit any group membership information from the communication. However, as new identity-based policies are defined and/or as user group membership changes, the distribution manager can later distribute policies to the site and optionally any corresponding group indices based on determining that the new policies indicate the user identifier, group identifier(s), and/or site identifier. As described at block 313, the communication can be over a secure connection established between the distribution manager and the network element corresponding to the site.

FIG. 4 is a flowchart of example operations for attaching a user identity index to outbound site-to-site network traffic for reduced-overhead retrieval of sender identity information. Site-to-site network traffic refers to network traffic sent between sites of the network (e.g., between SD-WAN sites), or between different subnets/LANs to which different network elements having instances of the service executing thereon have been deployed. Site-to-site network traffic the context of an SD-WAN is sometimes referred to as east-west traffic.

At block 401, the service detects at least a first outbound packet. The source address of the packet corresponds to a user and device of a first site in the network (e.g., a first branch site).

At block 403, the service determines if the packet is destined for a different site. The service determines if the destination address of the packet corresponds to the instant site, or the instant site's LAN/subnet, or a different, external site (e.g., a different branch). If the packet is destined for a different site, operations continue at block 405. Otherwise, if the packet is destined for an endpoint at the same site, operations continue at block 409.

At block 405, the service determines a user identity index corresponding to the source address of the packet. As described in reference to the earlier Figures, the instance of the service executing for the site obtains identity information and corresponding user identity indices for users local to the site, where the identity information associated with a user identity index maps an IP address to a user identifier and group identifier(s). The service determines the user identity index to which the source address of the packet corresponds by searching the local identity information for an entry corresponding to the source address.

At block 407, the service attaches the user identity index to the packet as metadata. The service can encapsulate the packet with a header that comprises the user identity index. For instance, the service can include the identity index in a custom field of a header that corresponds to the GENEVE header format or the VxLAN-GPE header format. If, in accordance with a configuration or architecture of the network, the packet was previously encapsulated with a header comporting to a designated format and having a custom field (e.g., for tunneling in accordance with GENEVE), the service may update the custom field with the user identity index to attach the identity index to the packet as metadata.

At block 409, the service sends the packet toward the destination address. This assumes that any applicable identity-based policies for outbound network traffic have been applied to the packet by leveraging the identity information maintained locally by the service and the packet was allowed to pass.

FIG. 5 is a flowchart of example operations for determining identity information corresponding to network traffic originating from an external site for identity-based policy enforcement. Generally, network traffic originating from an external site will be network traffic originating from an external branch of the network.

At block 501, the service detects at least a first incoming packet. The service detects a packet based on the network element on which it executes (i.e., the network device or firewall) receiving the packet on an interface thereof.

At block 503, the service determines if the packet source corresponds to a different site. If the packet source corresponds to a different site, another instance of the service should have encapsulated the packet with a header indicating a user identity index associated with the packet's origin as described above in reference to FIG. 4. Whether the packet corresponds to a different site can be based on a determination of whether the packet was encapsulated with such a header or based on a value of a header field that is used for communicating user identity indices. If the packet source corresponds to a different site, operations continue at block 505. Otherwise, if the packet originated within the same site, operations are complete; because the packet source is local (i.e., within the site) and the service previously obtained local identity information, the service can leverage the local identity information to determine the identity information corresponding to the packet source based on the packet's source address, and the local identity-based policies can be applied accordingly.

At block 505, the service determines a user identity index corresponding to the packet source based on metadata of the packet. The service can determine the user identity index based on the format of the header with which the packet was encapsulated (e.g., based on an offset value or header field used for communication of user identity index values).

At block 507, the service queries the controller for identity information corresponding to the packet source with the user identity index. The distribution manager that executes on the controller may expose an API to instances of the service by which it can be queried over a secure connection established therebetween. The query submitted by the service at least indicates the user identity index determined from the incoming packet. Also, the service can cache identity information and associated user identity indices as the identity information is retrieved from the controller. The service can first perform a lookup on the cache for the user identity index to determine if the associated identity information was previously retrieved and cached and can thus be obtained without querying the controller again. If the lookup does not yield a result, the service can then proceed with querying the controller.

At block 509, the service obtains identity information corresponding to the packet sender from the controller. A response to the query submitted to the controller should comprise the user identifier and any group identifiers associated with the user identity index. Retrieval of the identity information by the distribution manager executing on the controller for communication to the service is described in reference to FIG. 6. If the cache lookup at block 507 did not yield a result, the service can cache the identity information received from the controller in association with the user identity index for subsequent rapid retrieval. Additionally, the service may associate the identity information with a corresponding communication session to reduce the quantity of lookups for subsequent packets of the same session. For example, the service may maintain a data structure that associates session identifiers with identity information.

At block 511, the service selects identity-based policies that are applicable to the packet based on the identity information. Identity-based policies can include security policies, network path selection policies, and/or QoS policies that are to be applied to certain users and/or groups of users. The service can select any of the identity-based policies that indicate at least a subset of the obtained identity information (e.g., at least the user identifier and/or a group identifier(s) and are thus applicable to the packet based on the sender's identity information. The selected identity-based policies can then be applied to the packet.

FIG. 6 is a flowchart of example operations for retrieving requested identity information corresponding to a user identity index indicated in the request. The example operations of FIG. 6 can be performed after the controller is queried for identity information corresponding to a sender as described at block 507 of FIG. 5.

At block 601, the distribution manager receives an identity information request that indicates a user identity index. The distribution manager may receive the request following invocation of an API exposed by the distribution manager by an instance of the service. The request comprises a first identity index corresponding to a user At block 603, the distribution manager determines a user identifier corresponding to the user identity index. The distribution manager previously created an association between the user identity index and the user identifier after determining a correspondence between the user and an IP address, such as when the user was onboarded in the network from a device having the IP address and/or was authenticated as part of a user login from the device. The association between the user identity index and user identifier was created through insertion into a database or other data store maintained by or accessible to the distribution manager. The distribution manager performs a lookup on the user identity index and user identifier associations, such as through querying the database, to determine the user identifier that is associated with the user identity index.

At block 605, the distribution manager determines identifiers of any groups with which the user identifier is associated. If the user identifier is associated with a group(s), the group identifier(s) and/or group index(es) may have been previously stored in association with the user identifier (e.g., in the database that maintains associations between user identity indices and user identifiers). Alternatively, the distribution manager can query directory services with the user identifier for the group identifiers with which the user identifier is associated, if any.

At block 607, the distribution manager communicates the user identifier and any group identifiers and/or group indices to the requestor. The requestor (i.e., the instance of the service requesting identity information) can subsequently select identity-based policies to apply to detected network traffic based on the identity information comprising the user identifier and group information (i.e., group identifier(s) and/or indices) that it obtains from the distribution manager.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 7:
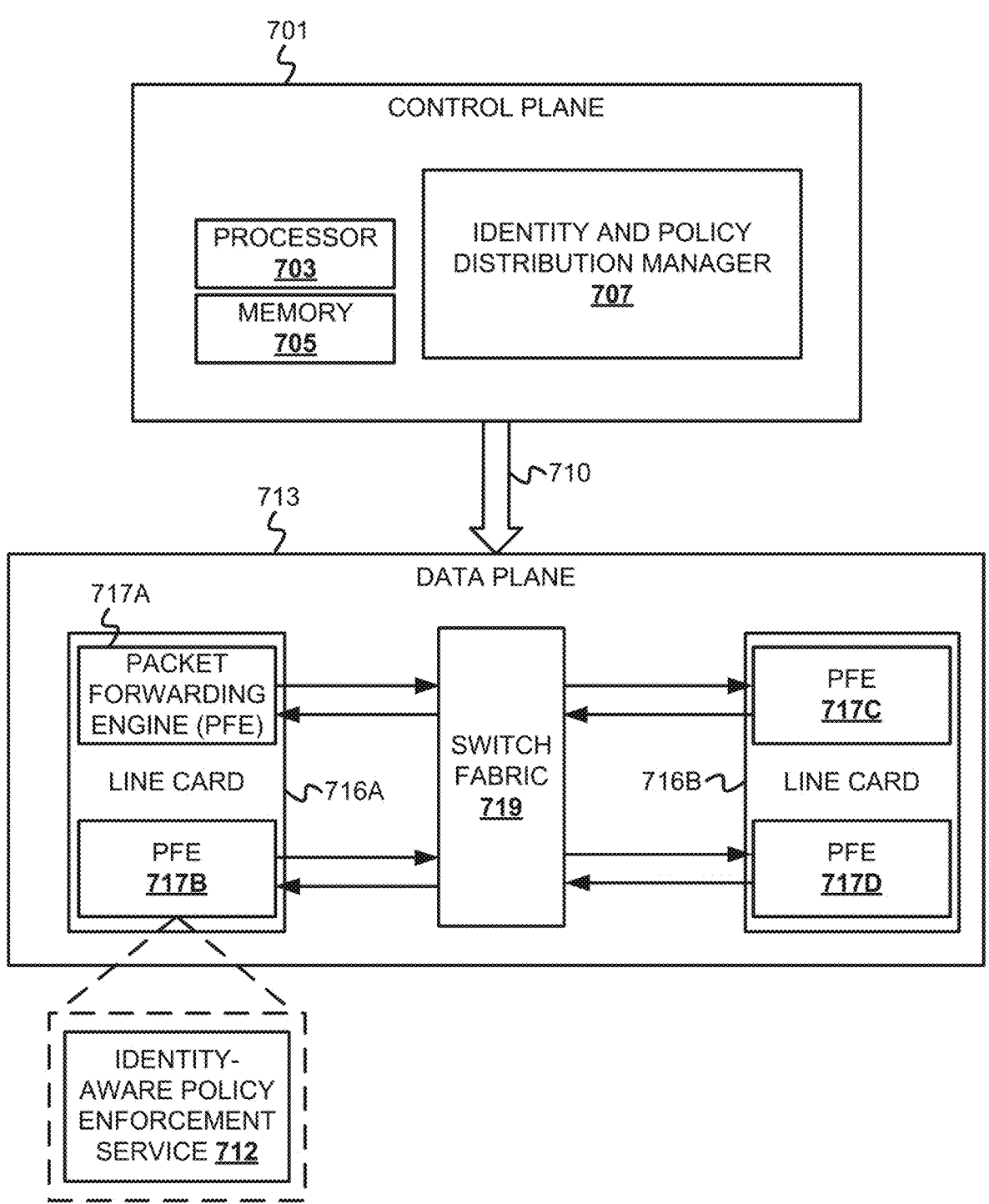
FIG. 7 depicts an example computer system with a data plane that includes an identity-aware policy enforcement service and a control plane that includes an identity and policy distribution manager.

FIG. 7 depicts an example computer system with a data plane that includes an identity-aware policy enforcement service and a control plane that includes an identity and policy distribution manager. The computer system includes a control plane 701 and a data plane 713. The control plane 701 includes a processor 703 (possibly including multiple processors, multiple cores, multiple nodes, and/or implementing multi-threading, etc.). The computer system includes memory 705. The memory 705 may be system memory or any one or more of the above already described possible realizations of machine-readable media. The control plane 701 also includes an identity and policy distribution manager 707. The identity and policy distribution manager 707 may be an application specific integrated circuit that is coupled with the processor 703 but distinct from the processor 703. The identity and policy distribution manager 707 distributes identity information and identity-based policies to network elements across sites (e.g., data centers and/or branches) of an overlay network. A communication channel 710 communicatively couples the control plane 701 to the data plane 713. The data plane 713 includes line cards 716A, 716B which communicate via a switch fabric 719. The line card 716A includes packet forwarding engines (PFEs) 717A, 717B. The line card 716B includes PFEs 717C, 717D. At least the PFE 717B includes an identity-aware policy enforcement service 712. The identity-aware policy enforcement service 712 selects identity-based policies to apply to incoming network traffic based on identity information retrieved from the identity and policy distribution manager 707 and communicates indications of sender identities with outgoing site-to-site network traffic.

The invention claimed is:

1. A method comprising:

detecting a first packet by a first network device at a first site of a plurality of sites of an overlay network, wherein the first network device maintains a plurality of identity-based policies;

based on determining that the first packet originated from a second site of the plurality of sites of the overlay network that differs from the first site, determining a first index corresponding to a user from which the first packet originated based on metadata of the first packet;

retrieving identity information corresponding to the user from which the first packet originated based on querying maintained associations between indices and user identity information with the first index;

selecting one or more of the plurality of identity-based policies that are applicable to the first packet based on the retrieved identity information; and applying the one or more identity-based policies to the first packet.

2. The method of claim 1, wherein determining that the first packet originated from a different site of the overlay network comprises determining that the first packet has been encapsulated with a header that stores the first index, and wherein determining the first index based on the metadata of the first packet comprises determining the first index based on the header.

3. The method of claim 2, wherein determining the first index comprises determining the first index from a corresponding field of the header or an offset value of the header.

4. The method of claim 1, wherein the identity information comprises at least one of an identifier of the user and one or more identifiers of a corresponding one or more groups of which the user is a member.

5. The method of claim 1, wherein selecting the one or more of the plurality of identity-based policies that are applicable to the first packet comprises selecting those of the plurality of identity-based policies that indicate at least a subset of the identity information of the user.

6. The method of claim 1, wherein retrieving the identity information comprises querying a network controller of the overlay network with the first index, wherein the network controller maintains the associations between indices and user identity information corresponding to users across sites of the overlay network.

7. The method of claim 1, wherein the overlay network is a software-defined wide area network (SD-WAN), and wherein the plurality of sites correspond to sites of the SD-WAN.

8. The method of claim 1, further comprising:

detecting, by a second network device at the second site of the overlay network, the first packet;

based on determining that the first packet is destined for the first site, determining the first index based on a source address of the first packet;

attaching the first index to the first packet as metadata of the first packet; and forwarding the first packet toward the second site of the overlay network.

9. One or more non-transitory machine-readable media having program code stored thereon, the program code comprising instructions to:

based on detection of a first packet at one of a plurality of sites of an overlay network, determine whether the first packet originated from another of the plurality of sites;

based on a determination that the first packet originated from another of the plurality of sites, determine an identity index corresponding to a user from which the first packet originated based on metadata of the first packet;

obtain one or more identifiers associated with the user based on querying maintained associations between identity indices and identifiers associated with users within the overlay network with the identity index, wherein the one or more identifiers comprises at least one of a user identifier and a group identifier;

select one or more of a plurality of identity-based policies that are applicable to the first packet based on a determination of which of the plurality of identity-based policies indicate at least a first of the one or more identifiers; and apply the one or more identity-based policies to the first packet.

10. The non-transitory machine-readable media of claim 9, wherein the instructions to determine whether the first packet originated from another of the plurality of sites comprise instructions to determine whether the first packet has been encapsulated with a header that stores the identity index, and wherein the instructions to determine the identity index based on the metadata of the first packet comprise instructions to determine the identity index from the header of the first packet.

11. The non-transitory machine-readable media of claim 10, wherein the instructions to determine the identity index comprise instructions to determine the identity index from a corresponding field of the header or an offset value of the header.

12. The non-transitory machine-readable media of claim 9, wherein the overlay network is a software-defined wide area network (SD-WAN), and wherein the plurality of sites are a plurality of sites of the SD-WAN.

13. A system comprising:

a network device comprising a first processor and a first machine-readable medium, wherein the first machine-readable medium has instructions stored thereon that are executable by the first processor to cause the network device to, based on detection of a first packet, determine if the first packet originated from an external site of an overlay network of which the network device is part;

based on a determination that the first packet originated from an external site, determine a first index corresponding to a user from which the first packet originated based on metadata of the first packet;

query maintained associations between indices and user identity information with the first index to retrieve identity information corresponding to the user from which the first packet originated; and select one or more of a plurality of identity-based policies to apply to the first packet based on the retrieved identity information, wherein the one or more identity-based policies indicate at least a subset of the identity information.

14. The system of claim 13, further comprising a network controller, wherein the network controller comprises a second processor and a second machine-readable medium having instructions stored thereon that are executable by the second processor to cause the network controller to maintain the associations between indices and user identity information.

15. The system of claim 14, wherein the instructions executable by the first processor to cause the network device to query the maintained associations comprise instructions executable by the first processor to cause the network device to query the network controller with the first index and retrieve the identity information from the network controller.

16. The system of claim 14, wherein the overlay network comprises a software-defined wide area network (SD-WAN), and wherein the network controller is an SD-WAN controller.

17. The system of claim 13, wherein the instructions executable by the first processor to cause the network device to determine if the first packet originated from an external site of the overlay network comprise instructions executable by the first processor to cause the network device to determine if the first packet has been encapsulated with metadata storing an index, and wherein the instructions executable by the first processor to cause the network device to determine that the first packet originated from an external site comprise instructions executable by the first processor to cause the network device to determine that the first packet comprises the metadata storing the first index.

18. The system of claim 17, wherein the instructions executable by the first processor to cause the network device to determine the first index comprise instructions executable by the first processor to cause the network device to determine the first index from a corresponding field of the metadata or an offset value of the metadata.

19. The system of claim 13, wherein the instructions executable by the first processor to cause the network device to query the maintained associations between indices and user identity information with the first index to retrieve the identity information comprise instructions executable by the first processor to cause the network device to query the maintained associations between indices and user identity information with the first index to retrieve at least one of an identifier of the user and one or more identifiers of a corresponding one or more groups of which the user is a member.

20. The system of claim 19, wherein the instructions executable by the first processor to cause the network device to select the one or more identity-based policies to apply to the first packet based on the retrieved identity information comprise instructions to determine that each of the one or more identity-based policies indicates at least one of the identifier of the user and a first of the one or more identifiers of a corresponding one or more groups.

\* \* \* \* \*